July 28, 1959 C. V. BERGER 2,897,131
REMOVAL OF ARSENIC WITH DEACTIVATED PLATINUM
CATALYST AND SUBSEQUENT REFORMING
Filed Nov. 25, 1953
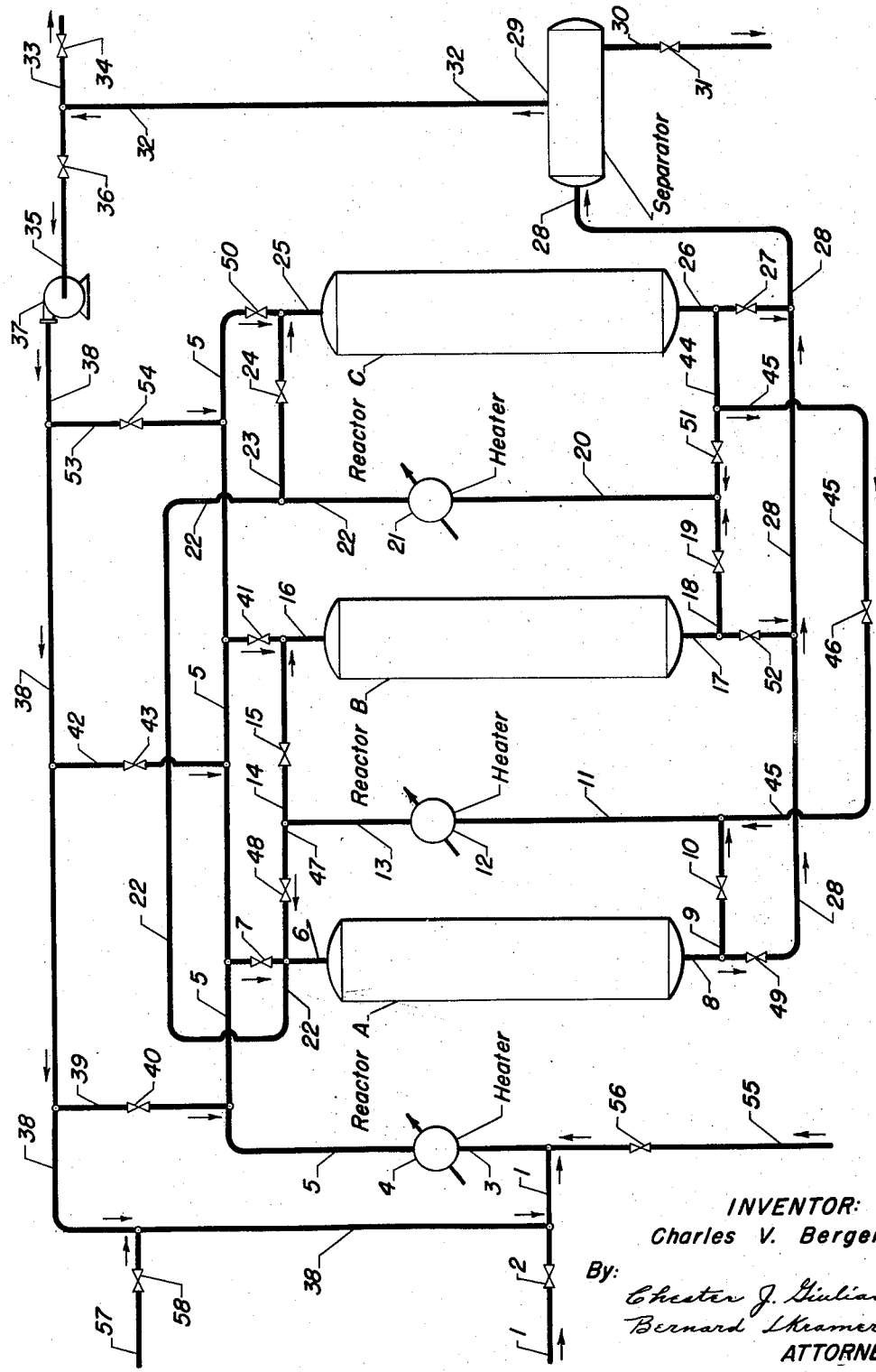
INVENTOR:
Charles V. Berger
By:
Chester J. Giuliani
Bernard L. Kramer
ATTORNEYS.

2,897,131
Patented July 28, 1959

2,897,131

REMOVAL OF ARSENIC WITH DEACTIVATED PLATINUM CATALYST AND SUBSEQUENT REFORMING

Charles V. Berger, Western Springs, Ill., assignor, by mesne assignments, to Universal Oil Products Company, Des Plaines, Ill., a corporation of Delaware Application November 25, 1953, Serial No. 394,449

6 Claims. (Cl. 208—65)

This invention relates to the conversion of gasoline fractions and more particularly to the conversion of gasoline fractions in the presence of a catalyst comprising a noble metal.

In one embodiment the present invention is directed to the reforming of a gasoline fraction in order to improve the antiknock properties thereof. The reforming process entails several specific reactions including dehydrogenation of naphthenes to aromatics, dehydrocyclization of paraffins to aromatics, isomerization of paraffins to more highly branched paraffins, hydrogenation of olefins, hydrocracking, etc., as well as desulfurization, etc. These reactions proceed at different rates and, in order to produce a final product of substantially constant quality, it is desirable that the catalyst is of substantially the same activity throughout the process. For example, it is preferred in the reforming process to utilize a plurality of reactors, with intermediate heating between the reactors in order to compensate for the loss in temperature due to the endothermicity of the reactions. When using a plurality of reactors, certain reactions occur in the first reactor and, in order to obtain a uniform quality product throughout the run, it is desirable that the activity of the catalyst be constant so that the reactions effected therein are substantially uniform.

Certain impurities in the charge stock tend to deposit on and/or react with the catalyst in the first reactor to a greater extent than in subsequent reactors. This results in a progressive decrease in activity of the catalyst in the first reactor and accordingly a variance in the extent of the reactions effected therein, resulting in a fluctuation in the quality of the final product. This deactivation of the catalyst is particularly serious in the case of impurities which react with the noble metal component of the catalyst.

Arsenic impurities react with the platinum in a platinum-containing catalyst and thereby deactivate the catalyst, thus destroying the uniformity of reactions and accordingly the uniform quality of the final product. This is especially undesirable in processes using a catalyst containing small concentrations of metals as, for example, in the Platforming process in which the platinum is present in the catalyst in a concentration of below about 1%. It is apparent that, as the small concentration of platinum is deactivated by arsenic impurities, the activity of the catalyst is accordingly reduced and the catalyst therefore cannot effect the desired reactions to a uniform degree.

The difficulties hereinbefore set forth are avoided by the method of the present invention, in which method the arsenic impurities are removed from the charge before the charge enters the first reforming reactor. It is a particular advantage to the novel process of the present invention that the catalyst previously used for effecting the reforming reaction and deactivated to an extent below that satisfactory for effecting the desired reactions is utilized to remove the arsenic impurities from the charge. The catalyst also becomes deactivated by other impurities, carbon formation, excessive temperatures, etc. The present invention will reduce deactivation due to impurities in the charge. This process results in more efficient utilization of the catalyst before discarding from the process and also eliminates the necessity of purchasing different catalysts for this purpose.

In one embodiment the present invention relates to a process for the conversion of a gasoline fraction containing arsenic impurities, in which said gasoline fraction is passed in series through a plurality of zones, each containing a catalyst comprising a noble metal, which comprises contacting said gasoline fraction with the catalyst in the first of said zones at a temperature of from about 200° to about 800° F., and then with the catalyst in the remaining of said zones at a temperature of from about 825° F. to about 1200° F.

In a specific embodiment the present invention relates to a process for the reforming of naphtha containing arsenic impurities in a concentration of below about 400 parts per billion, which comprises passing said naphtha in series through a plurality of zones, each containing a catalyst comprising alumina, combined halogen and platinum in a concentration of from about 0.1% to about 1% by weight, contacting said naphtha with the catalyst in the first of said zones at a temperature of from about 500° to about 750° F. and then with the catalyst in the remaining of said zones at a temperature from about 850° to about 1000° F.

The gasoline fraction for conversion in the present process contains arsenic impurities and may comprise a full boiling range gasoline having an initial boiling point of from about 50° to about 150° F. and an end boiling point of from about 350° to about 400° F., or it may comprise any selected fraction thereof. In many cases, a naphtha fraction is preferred as charge for reforming, and the naphtha fraction may have initial boiling of from about 150° to about 300° F. and an end boiling point of from about 325° to about 400° F. In still another embodiment the naphtha may have a boiling range of from about 300° to about 400° F. In still other cases, the gasoline fraction may contain components boiling above the normal gasoline range of 400° F. and thus may have a boiling point up to 450° F. or higher. When applied primarily to the production of aromatics, the charge may comprise a naphthene fraction comprising principally methycyclopentane, cyclohexane, methylcyclohexane, polymethylcyclohexanes, polymethylcyclopentanes, ethylcyclohexane, etc. or mixtures of two or more of these components. It is understood that reference to gasoline fraction in the present specification and claims is intended to include the full boiling range or any selected fraction of gasoline or naphtha.

The process of the present invention is particularly applicable to the treatment of charge stocks containing a moderate concentration of arsenic impurities. In general, the amount of arsenic may range up to about 350–400 parts per billion and preferably up to about 300 parts per billion. When the charge contains arsenic impurities to a considerably larger extent, it may be necessary to employ other means of removing at least a bulk of the arsenic and then utilize the present process to remove the remaining portion.

The catalyst for use in the process of the present invention contains a noble metal and particularly platinum. Other noble metals include palladium, silver, gold, etc. The novel features of the present invention may be used with any catalyst adversely affected by arsenic impurities in the charge and thus is particularly applicable for use in catalysts containing rare or expensive metals such as ruthenium, rhodium, osmium, iridium, etc., because of the high cost of the metal.

A preferred catalyst comprises platinum composited with a suitable refractory oxide, the platinum being in a concentration of from about 0.01% to about 5% by weight and preferably from about 0.1% to about 1%. A particularly preferred refractory oxide comprises alumina and still more particularly alumina and combined halogen, the halogen being present in a concentration of from about 0.1% to about 8% by weight of the alumina and more particularly in a concentration of from about 0.2% to about 5% by weight. Combined fluorine and/or combined chlorine are preferred and, when a mixture thereof is used, the total will be within the concentration hereinbefore set forth. Still other refractory oxides comprise mixtures including silica-alumina, silica-zirconia, silica-magnesia, silica-thoria, etc., silica-alumina-zirconia, silica-alumina-magnesia, silica-alumina-thoria, etc. When desired, halogen may be combined with the mixture of refractory oxides, the concentration of halogen being within the range hereinbefore set forth. It is understood that the platinum or other noble metal may be present in the catalyst as the metal or as a compound thereof and particularly the oxide, sulfide, etc. Reference to platinum in the present specification and claims is intended to include both the platinum metal and compounds thereof.

In accordance with the present invention, the charge is contacted in the first of a plurality of zones at a temperature sufficient to react the arsenic impurities with the platinum contained in the catalyst and thereby prevents the arsenic impurities from contacting the catalyst in the remaining zones. In general, the temperature employed in the first zone will be within the range of from about 200° to about 800° F. and preferably within the range of from about 500° to about 750° F. Superatmospheric pressure generally is preferred in this step of the process, because it avoids the necessity of increasing the pressure between the first and the remaining zones and also, in some cases, substantially liquid phase or a mixed phase operation is desired. The pressure preferably is within the range of from about 200 to 1000 pounds or more. However, depending upon the charge, the temperature employed in the first zone may be above the critical temperature and therefore the contact therein is effected in vapor phase or in mixed phase. The time of contact in the first reactor will be sufficient to effect substantially complete reaction of the arsenic impurities with the platinum, so that the effluent from this reactor is substantially free from arsenic impurities.

The reforming reactions effected in the second and succeeding zones generally are accomplished at a temperature of from about 825° to about 1200° F. and preferably within the range of from about 850° to about 1000° F. The pressure to be utilized will depend upon whether the reaction is reforming or primarily aromatization and will be within the range of from about 100 to 1000 pounds or more. The time in contact will be sufficient to effect the desired reactions and may range from a weight hourly space velocity of from about 0.05 to 10 or more. The reforming is effected in the presence of hydrogen, generally at a mol ratio of hydrogen to hydrocarbon of from about 0.1 to 10 or more.

In the preferred operation of the process, when the catalyst in the first reforming reactor becomes deactivated to a pre-determined extent, the reactor is no longer utilized for reforming but the catalyst is used to remove arsenic impurities from the charge. When this catalyst subsequently becomes saturated with arsenic, the reactor is no longer used in the process but the catalyst is withdrawn and replaced by fresh catalyst or the catalyst is reactivated in any suitable manner to restore the reforming activity thereof. When this occurs, the second reactor in the series becomes the first reactor and is utilized to remove arsenic from the charge. Thus it is seen that a continuous process is maintained, and at the same time the decline in activity of the reforming catalyst due to arsenic poisoning is considerably retarded.

The invention is illustrated further in the accompanying diagrammatic flow drawing and in the following description of specific operations of the process. In the interest of simplicity, the drawing and the following description will be directed to the reforming of gasoline, although it is understood that other gasoline fractions may be treated in the process and other reactions effected therein.

Referring to the drawing, it will be assumed that reactor A is utilized for removing arsenic impurities from the charge and that reactors B and C are utilized for effecting the reforming reactions. While the drawing illustrates three reactors, it is understood that two or four or more reactors may be employed, generally one more reactor being provided than actually required so that one reactor may be out of service without disrupting the continuity of the process. The gasoline charge is introduced into the process through line 1 and valve 2 and, in a preferred embodiment, is commingled with hydrogen recycled within the process in a manner to be hereinafter described. The gasoline and hydrogen are directed through line 3, heater 4, line 5, line 6 and valve 7 into reactor A. In heater 4 the gasoline fraction and hydrogen are heated to a temperature of from about 400° to about 800° F. and are contacted with the catalyst in reactor A. The catalyst in reactor A previously had been used for effecting the reforming reactions but had been deactivated to an extent unsatisfactory for further use. In reactor A the arsenic impurities react with the platinum, and the gasoline fraction now substantially free of aromatic impurities is passed through line 8, line 9, valve 10, line 11, heater 12, line 13, line 14, valve 15 and line 16 into reactor B. In heater 12, the gasoline fraction and hydrogen are heated to a temperature of from about 825° to about 1200° F. and are contacted with the catalyst in reactor B. Because of the removal of arsenic impurities in reactor A, the catalyst in reactor B will retain substantially constant properties for effecting the reforming reactions. The effluent products from reactor B are passed through line 17, line 18, valve 19, line 20, heater 21, line 22, line 23, valve 24 and line 25 into reactor C. In heater 21 the effluent from reactor B is heated to a temperature of from about 825° to about 1200° F. and is contacted with the catalyst in reactor C., whereby the reforming reactions are completed. The effluent from reactor C is withdrawn therefrom through line 26 and is passed through valve 27 and line 28 into separator 29.

It is understotd that the catalyst in reactors A, B and C are of the same original composition and, as hereinbefore set forth, this avoids the necessity of employing different type catalysts within the process. Also, as hereinbefore set forth, this method provides for efficient and complete utilization of the catalyst before discarding the same.

While heaters 4, 12 and 21 are illustrated as being of the heat exchanger type, it is understood that any suitable heaters may be used for this purpose and may comprise externally fired furnaces, etc. A particularly suitable furnace arrangement comprises one which includes three separate banks of heater tubes, through which the different streams flow independently and which are positioned in the furnace in the manner to obtain maximum efficiency.

The effluent from reactor C is directed into separator 29, and separation of liquid and gas is accomplished therein, either by reduction of pressure by means of valve 27 or otherwise and/or by means of cooling in any suitable manner, not illustrated. The reformed gasoline is withdrawn from separator 29 through line 30 and valve 31 and may be subjected to further fractionation or other treatment or use as desired. The gas withdrawn through line 32 from separator 29 will be rich in hydrogen and, while a portion thereof may be withdrawn through line 33 and valve 34, preferably at least a portion thereof is directed through line 35, valve 36, compressor 37 and line 38 to commingle with the gasoline charge introduced through line 1 and utilized in the process in the manner hereinbefore set forth. When desired, all or a portion of the hydrogen being recycled by way of line 38 may be passed directly by way of line 39, valve 40, line 5 and line 6 into reactor A.

When the catalyst in reactor A becomes saturated with arsenic, this reactor is cut out of the flow, and reactor B is utilized to remove arsenic impurities from the charge. The catalyst in reactor A may be removed and replaced or reactivated in any suitable manner. Reactor C then comprises the reforming zone but usually one or more additional reactors will be utilized and the flow will be in series through these reactors. However, for the purpose of illustration, it is assumed that reactor C is the sole reforming reactor. In this case, the gasoline charge and hydrogen are passed in the manner hereinbefore set forth through heater 4, line 5, line 16 and valve 41 into reactor B. The effluent then passes through heater 21 into reactor C in the manner hereinbefore set forth. When desired, the hydrogen in line 38 may be directed through line 42 and valve 43 directly into reactor B. The effluent from reactor C passes through lines 26 and 28 into separator 29. After the catalyst has been replaced in reactor A and reactor A is to be restored in the system, effluent from reactor C may be directed through line 26, line 44, line 45, valve 46 and then is directed through line 11, heater 12, line 13, line 47, valve 48 and line 6 into reactor A. The effluent therefrom is withdrawn through line 8 and is passed through valve 49 and line 28 into separator 29.

When the catalyst in reactor B becomes saturated with arsenic, this reactor is cut out of the flow, and the gasoline charge and hydrogen are introduced first into reactor C. This is accomplished by passing the gasoline and hydrogen through heater 4 and line 5 in the manner hereinbefore set forth and then through valve 50 and line 25 into reactor C. The effluent is passed through line 26, line 44 and valve 51 into line 20, then through heater 21, line 22 and line 6 into reactor A. The effluent from reactor A is passed in the manner hereinbefore set forth through heater 12 and lines 14 and 16 into reactor B. The products from reactor B are directed through line 17, valve 52 and line 28 into separator 29. The hydrogen being recycled by way of compressor 37 may be directed through line 53, valve 54 and lines 5 and 25 directly into reactor C, when desired.

Hydrogen from an extraneous source may be introduced into the process through line 55 and valve 56 to be heated with the gasoline charge when desired or the hydrogen may be introduced through line 57 and valve 58 to be supplied directly to any one or all of the reactors.

In some cases it may be preferred to effect the arsenic removal in the absence of added or recycled hydrogen, and this may be accomplished by passing the hydrogen directly to the desired reactor or reactors in the manner hereinbefore set forth. This method is particularly desirable when liquid phase or mixed phase conditions are desired in the reactor utilized to remove arsenic impurities.

The following example is introduced to illustrate further the novelty and utility of the present invention, but not with the intention of unduly limiting the same.

*Example*

The catalyst used in this example comprises alumina, combined fluorine in a concentration of 0.03% by weight and platinum in a concentration of 0.4% by weight. The charge comprises a straight-run naphtha having a boiling range of from about 200° to about 400° F. The charge is contacted with the catalyst in the first reactor of the series at a temperature of 600° F. and a pressure of 600 pounds per square inch, then is contacted with the catalyst in the next reactor at an inlet temperature of 925° F. and a pressure of 500 pounds per square inch and subsequently is contacted with the catalyst in the remaining three reactors at an inlet temperature of about 925° F. When the catalyst in the first reactor becomes substantially saturated with arsenic, the reactor is removed from the system and the flow is continued in the manner hereinbefore set forth.

An operation in the manner hereinbefore set forth will result in a more uniform quality of reformed products for a considerably longer period of time than is obtained in the absence of the removal of the arsenic impurities from the charge.

I claim as my invention:

1. In a process for the reforming of a gasoline fraction containing arsenic impurities in the presence of a catalyst comprising alumina and platinum in a concentration of from about 0.1% to about 1% by weight, wherein said gasoline fraction is passed in series through a plurality of zones each containing a portion of said catalyst, the method of obtaining a substantially uniform product for a long period of time, which comprises contacting said gasoline fraction at a temperature of from about 500° to 750° F. first with the catalyst which previously had been deactivated by use in the reforming reaction, whereby to remove the arsenic impurities, and then at a temperature of from about 850° to about 1000° F. with the catalyst in the remainder of said zones to effect the reforming.

2. In a process for the aromatization of a naphthene fraction containing arsenic impurities in the presence of a catalyst comprising alumina and platinum in a concentration of from about 0.1% to about 1% by weight, wherein said naphthene fraction is passed in series through a plurality of zones each containing a portion of said catalyst, the method of obtaining a substantially uniform product for a long period of time, which comprises contacting said gasoline fraction at a temperature of from about 200° to about 800° F. first with the catalyst which previously had been deactivated by use in the aromatization reaction, whereby to remove the arsenic impurities, and then at a temperature of from about 825° to 1200° F. with the catalyst in the remainder of said zones to effect the aromatization.

3. In a process for the conversion at a temperature of from about 825° to about 1200° F. of a gasoline fraction containing arsenic impurities, in the presence of a catalyst comprising platinum in a concentration of from about 0.01% to about 5% by weight, wherein said gasoline fraction is passed in series through a plurality of zones each containing a portion of said catalyst, and wherein the catalyst in the first of said zones normally becomes deactivated at a rapid rate because of arsenic poisoning, the method of obtaining a substantially uniform product for a long period of time, which comprises contacting said gasoline fraction with a spent portion of the catalyst in said first zone at a temperature of from about 200° to about 800° F. to remove arsenic impurities from said gasoline fraction, said spent portion of the catalyst having been deactivated by previous use in gasoline reforming, and then passing the thus treated gasoline fraction into contact at a temperature of from about 825° to about 1200° F. with the catalyst in the next zone in the series to reform the treated gasoline fraction.

4. In the reforming of a gasoline fraction in the presence of a reforming catalyst comprising platinum, said fraction containing arsenic impurities harmful to the catalyst, the method which comprises initially contacting the gasoline fraction with a portion of the platinum-containing catalyst substantially deactivated for gasoline reforming by previous use in the reforming process, said contacting being at a temperature sufficient to react the arsenic impurities with the platinum content of said portion of the catalyst, whereby to purify the gasoline fraction with respect to arsenic, and thereafter contacting the thus purified gasoline fraction at reforming conditions with a more active portion of said platinum-containing reforming catalyst.

5. In a process for the reforming of a gasoline fraction containing arsenic impurities, in which said gasoline fraction is passed in series through a plurality of zones, each contaning a catalyst comprising platinum, the improvement which comprises contacting said gasoline fraction with a substantially deactivated portion of said catalyst in the first zone of the series at a temperature of from about 200° to about 800° F. to remove arsenic impurities therefrom, said portion of the catalyst having been deactivated by previous use in gasoline reforming, and then contacting the gasoline fraction with an active portion of said catalyst in the remainder of said zones at a temperature of from about 825° to about 1200° F. to reform the same.

6. The process of claim 5 further characterized in that the first-mentioned portion of the catalyst has been deactivated by previous use thereof as reforming catalyst in a zone of said series following said first zone.

References Cited in the file of this patent
UNITED STATES PATENTS

| | | |
|---|---|---|
| 2,401,334 | Burk et al. | June 4, 1946 |
| 2,479,109 | Haensel | Aug. 16, 1949 |
| 2,550,531 | Ciapetta | Apr. 24, 1951 |
| 2,566,353 | Mills | Sept. 4, 1951 |
| 2,642,381 | Dickinson | June 6, 1953 |
| 2,723,946 | Donaldson | Nov. 15, 1955 |
| 2,769,770 | Bicek | Nov. 6, 1956 |

OTHER REFERENCES

"The Influence of Mercury Sulphur Arsenic and Zinc on the Catalytic Activity of Platinum," by E. B. Maxted, Chemical Society Journal, vol. 119, part 1, 1921, pages 225 to 233.

Science of Petroleum, Oxford University Press, 1938, vol. 11, page 1054, upper table, column 1, line 14 (Texas).

"Chemical Refining of Petroleum," by Kalichevsky et al., page 34 (1942), Reinhold Pub. Co., New York, N.Y.